United States Patent [19]

Hofmann et al.

[11] 4,296,979
[45] Oct. 27, 1981

[54] JOURNAL BEARING FOR THE SHAFT OF A WATER PUMP OR THE LIKE

[75] Inventors: Heinrich Hofmann; Günther Markfelder, both of Schweinfurt, Fed. Rep. of Germany

[73] Assignee: Fag Kugelfischer Georg Schäfer & Co., Schweinfurt, Fed. Rep. of Germany

[21] Appl. No.: 123,027

[22] Filed: Feb. 20, 1980

[30] Foreign Application Priority Data

Feb. 24, 1979 [DE] Fed. Rep. of Germany ....... 2907342

[51] Int. Cl.³ .................... F16C 19/49; F16C 19/18; F16C 33/46
[52] U.S. Cl. ................................ 308/174; 308/189 R; 308/217
[58] Field of Search .................. 308/174, 189 R, 201, 308/207 R, 210, 217

[56] References Cited

U.S. PATENT DOCUMENTS

| | | | |
|---|---|---|---|
| 3,416,848 | 12/1968 | Recknagel | 308/174 |
| 3,424,507 | 1/1969 | Rollins et al. | 308/174 |
| 3,899,225 | 8/1975 | Elmore et al. | 308/174 |
| 3,973,811 | 8/1976 | Noguera | 308/189 R |
| 4,153,309 | 5/1979 | Markfelder et al. | 308/174 |
| 4,244,630 | 1/1981 | Tischer | 308/245 |

FOREIGN PATENT DOCUMENTS

| | | | |
|---|---|---|---|
| 165580 | 2/1934 | Switzerland | 308/174 |
| 1406982 | 9/1975 | United Kingdom | 308/174 |

*Primary Examiner*—Richard R. Stearns
*Attorney, Agent, or Firm*—Karl F. Ross

[57] ABSTRACT

A journal bearing for a pump shaft comprises a sleeve whose inner peripheral surface forms two grooved tracks for respective sets of bearing balls adjacent one end thereof and forms a retaining groove near the other end. The two sets of bearing balls, held in respective cages, are also received in a pair of closely spaced peripheral grooves of the shaft confronting the tracks of the sleeve, thereby preventing relative axial shifting of the sleeve and the shaft. A set of bearing rollers are inserted between smooth surface portions of the shaft and the sleeve near the opposite end of the latter and are lodged in pockets of an annular cage having a peripheral rib snap-fitted into the retaining groove.

4 Claims, 2 Drawing Figures

JOURNAL BEARING FOR THE SHAFT OF A WATER PUMP OR THE LIKE

FIELD OF THE INVENTION

Our present invention relates to an assembly of a rotatable shaft, e.g. that of a water pump for an automotive vehicle or the like, and a journal bearing therefor also designed to hold that shaft against axial displacement.

BACKGROUND OF THE INVENTION

For the absorption of both radial and axial stresses it is known to use one or more sets of rotary bodies, i.e. rollers or balls, which are partly received in confronting track grooves of an outer race formed by a bearing sleeve and an inner race which may be constituted by the peripheral surface of the shaft itself.

The shaft of a vehicular water pump, for example, is subjected to torques due to unbalances of the pump motor and other components carried thereon, e.g. a fan, aside from experiencing bending moments due to the stress of the V-belt by which it is driven. The mounting of that shaft, therefore, must be designed to absorb all these stresses while also resisting axial forces, e.g. those resulting from the air pressure upon the fan blades.

In a commonly owned copending application, Ser. No. 76,360 filed 17 Sept. 1979 by Roland Tischer, now U.S. Pat. No. 4,244,630, there has been disclosed a bearing assembly with two sets of rotary bodies, specifically a set of balls and a set of rollers, near opposite ends of a cylindrical shell coaxially surrounding the associated shaft. In order to facilitate the assembly of such a shaft mounting, the shell is divided into two axially spaced bearing rings interconnected by a sleeve of elastomeric material engaging these rings with a snap fit. A bearing with three sets of rotary bodies, namely two outer rows of balls and a centrally disposed row of rollers, is disclosed in Swiss Pat. No. 165,580.

In general, a set of centrally disposed bearing balls or rollers contributes nothing to the absorption of bending moments such as those exerted by a driving belt. Rollers, which tend to stiffen the shaft against radial deflection, are therefore more advantageously placed near an end of a journal bearing as described in the commonly owned application referred to.

Still, the provision of a third set of rotary bodies increases the load-sustaining capacity of the bearing, especially when the surrounding cylinder is of unitary all-metallic structure. Balls guided in track grooves are conventionally used to prevent relative axial shifts of the two races. As long as the combined depth of the two confronting grooves is substantially less than the ball radius, the balls can be readily inserted when the sleeve is eccentrically positioned on the shaft, this operation being followed by a peripheral distribution of the balls in the clearance between the shaft and the sleeve while the latter is being centered on the shaft axis. The balls can then be held separated by an axially introduced annular cage as is well known per se. Only two axially spaced sets of balls, however, can be introduced into a unitary bearing sleeve by this procedure.

OBJECT OF THE INVENTION

The object of our present invention is to provide a bearing assembly with three sets of rotary bodies designed to resist axial and radial stresses as well as bending moments.

SUMMARY OF THE INVENTION

We realize this object, in accordance with our present invention, by the provision of a sleeve whose inner peripheral surface has a first zone with two closely spaced annular track grooves adjacent one end thereof and a second zone with an annular retaining groove adjacent the other end thereof, the associated shaft being provided with two closely spaced peripheral track grooves respectively confronting the annular track grooves of the first zone of the sleeve. The balls of the two sets are engaged by respective cages which, in order to be insertable into the sleeve from opposite ends, should have ball-receiving pockets that are open toward each other. A set of rollers are inserted in the second zone between the shaft and the sleeve, these rollers being engaged by a third cage which has a peripheral rib snap-fitted into the retaining groove of the sleeve. The roller as well as the balls are preferably in direct contact with the shaft surface though the interposition of a bushing (suitably grooved in the case of the balls) is by no means excluded.

For optimum absorption of bending moments, the two sets of balls should lie on one side of the axial midpoint of the sleeve, with the rollers located on the opposite side thereof. Thus, the shaft is stiffened to resist bending at both ends of the bearing sleeve.

BRIEF DESCRIPTION OF THE DRAWING

The above and other features of our invention will now be described in detail with reference to the accompanying drawing in which.

SPECIFIC DESCRIPTION

Figure 1:
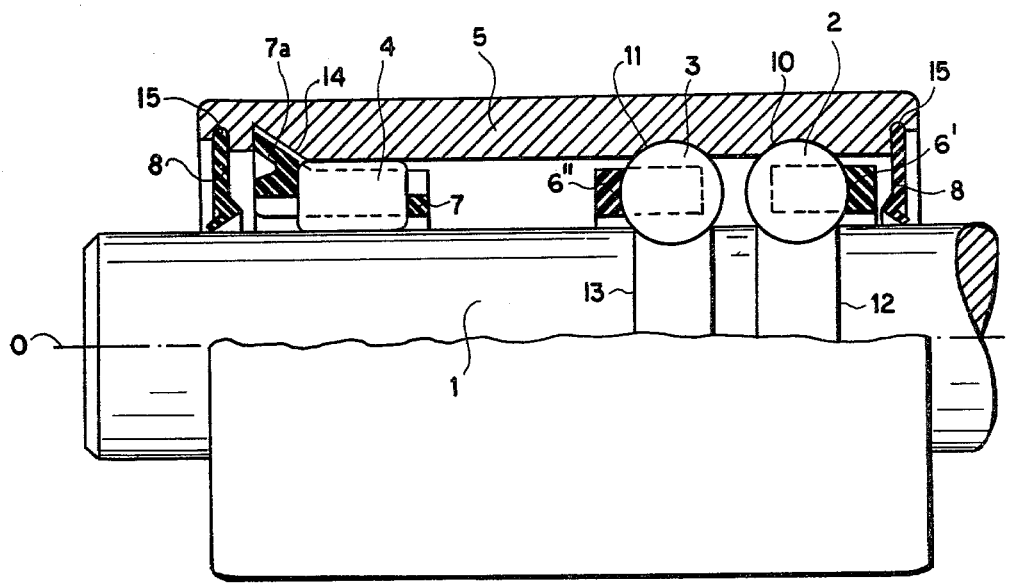
FIG. 1 shows, in elevation and partly in axial section, a bearing assembly for a rotatable shaft embodying our invention.

In FIG. 1 we have shown a horizontal shaft 1, which may be that of a vehicular water pump, mounted in a nonillustrated housing through the intermediary of a bearing sleeve 5 centered on the shaft axis 0. The cylindrical inner surface of the unitary metallic sleeve 5 is formed with two shallow track grooves 10 and 11 of arcuate cross-section confronting similar grooves 12 and 13 on the shaft surface. Two sets of balls 2 and 3 are respectively received in the groove pairs 10, 12, and 11, 13, the balls of each set being held spaced apart by an annular cage 6' or 6" of crenellate configuration resiliently engaging the balls over roughly 270° of their periphery. At the opposite end of sleeve 5 there is provided a retaining groove 14 of triangular cross-section receiving a peripheral rib 7a of an annular cage 7 with pockets fully embracing respective rollers 4. The annular space accommodating the rotary bodies 2, 3 and 4 is closed against the outside by flexible sealing rings 8 snapped into peripheral grooves 15, e.g. as known per se from commonly owned U.S. Pat. No. 3,796,510.

The combination of cage 7 and rollers 4 can be preassembled on the projecting left-hand extremity of shaft 1 and then slid axially into the sleeve 5 after the balls 2, 3 and their cages 6', 6" have been emplaced near its right-hand end in the manner described above.

Figure 2:
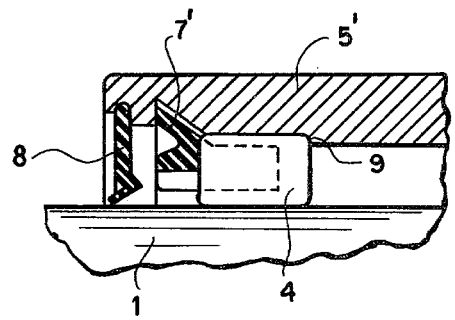
FIG. 2 is a fragmentary part-sectional view illustrating a modification.

As shown in FIG. 2, cage 7 may be replaced by a crenellated cage 7' with open-ended pockets partly embracing the rollers 4, the sleeve 5' being provided in that case with an internal annular shoulder 9 to prevent a rightward shift of the rollers. It will be apparent that, instead or in addition, such a shoulder could also be formed on the shaft 1.

The axial separation of rollers 4 from the nearer set of balls 3 substantially exceeds the mutual axial spacing of the two sets of balls 2 and 3.

We claim:

1. In an assembly of a rotatable shaft and a journal bearing therefor, the improvement wherein said journal bearing comprises: a sleeve with a cylindrical inner peripheral surface having a first zone with two closely spaced annular track grooves offset from the axial midpoint of the sleeve adjacent one end thereof and a second zone with an annular retaining groove adjacent the other end thereof, said shaft being provided with two closely spaced peripheral track grooves respectively confronting the annular track grooves of said first zone;

two sets of balls respectively received in said track grooves of said shaft and said sleeve, the balls of each set being respectively engaged by a first and a second cage;

a set of rollers inserted in said second zone between said shaft and said sleeve; and a third cage engaging said rollers, said third cage being provided with a peripheral rib snap-fitted into said retaining groove.

2. An assembly as defined in claim 1 wherein said rollers are separated from said sets of balls by an axial distance substantially exceeding the axial spacing of said sets of balls from each other.

3. An assembly as defined in claim 1 or 2 wherein said first and second cages have ball-receiving pockets open toward each other.

4. An assembly as defined in claim 1 or 2 wherein said sleeve is a unitary metallic member.

* * * * *